F. H. MAGNUS ET AL

2,693,843

APPARATUS FOR AUTOMATICALLY ASSEMBLING A STRUCTURE
CONSISTING OF A NUMBER OF SEPARATE PARTS

Filed Oct. 5, 1950

INVENTORS
FINN H. MAGNUS
BY CHARLES J. OBST

Burgess, Ryan & Hicks
ATTORNEYS

Nov. 9, 1954   F. H. MAGNUS ET AL   2,693,843
APPARATUS FOR AUTOMATICALLY ASSEMBLING A STRUCTURE
CONSISTING OF A NUMBER OF SEPARATE PARTS
Filed Oct. 5, 1950   9 Sheets-Sheet 7

INVENTORS
FINN H. MAGNUS
BY CHARLES J. OBST
Burgess, Ryan & Hicks
ATTORNEYS

Nov. 9, 1954 F. H. MAGNUS ET AL 2,693,843
APPARATUS FOR AUTOMATICALLY ASSEMBLING A STRUCTURE
CONSISTING OF A NUMBER OF SEPARATE PARTS
Filed Oct. 5, 1950 9 Sheets-Sheet 9

INVENTORS
FINN H. MAGNUS
BY CHARLES J. OBST
Burgess, Ryan & Hicks
ATTORNEYS

United States Patent Office 2,693,843
Patented Nov. 9, 1954

2,693,843

APPARATUS FOR AUTOMATICALLY ASSEMBLING A STRUCTURE CONSISTING OF A NUMBER OF SEPARATE PARTS

Finn H. Magnus, Essex Fells, N. J., and Charles J. Obst, Brooklyn, N. Y., assignors to Magnus Harmonica Corporation, Newark, N. J., a corporation of New Jersey Application October 5, 1950, Serial No. 188,552

20 Claims. (Cl. 154—1)

The present invention relates to new and useful improvements in machines for automatically assembling a number of parts into a unitary structure and relates more particularly to a machine for automatically assembling the parts of a plastic harmonica.

An object of the present invention is to provide a machine by means of which a number of parts may be automatically assembled into a finished unit which is ready for packaging as it leaves the machine. Another object of the invention is to provide a machine which will automatically assemble a number of separate parts having different contours and shapes rapidly and in accurate alignment with each other without any manual operations being involved in the assembly. A further object of the invention is to provide an assembling machine in which the dimensions of the assembled units are checked as they leave the machine to insure that the unit has been correctly assembled before the units are delivered to the packaging machine.

Various other objects and advantages of the invention will be apparent and best understood from the following description and the accompanying drawings in which.

Referring to the drawings in detail, there is a platform 25 which is supported by a framework 26. A work carrying table in the form of an annular ring 27 is rotatably secured to the top of the platform 25 by a central member 25a. As shown best in Fig. 7, the work table or ring 27 is supported on the platform 25 by rollers 27a and rollers 25b are also interposed between the inner side of the ring 27 and the outer side of the central member 25a. This arrangement permits the work table to rotate freely on the platform 25.

Figure 4:
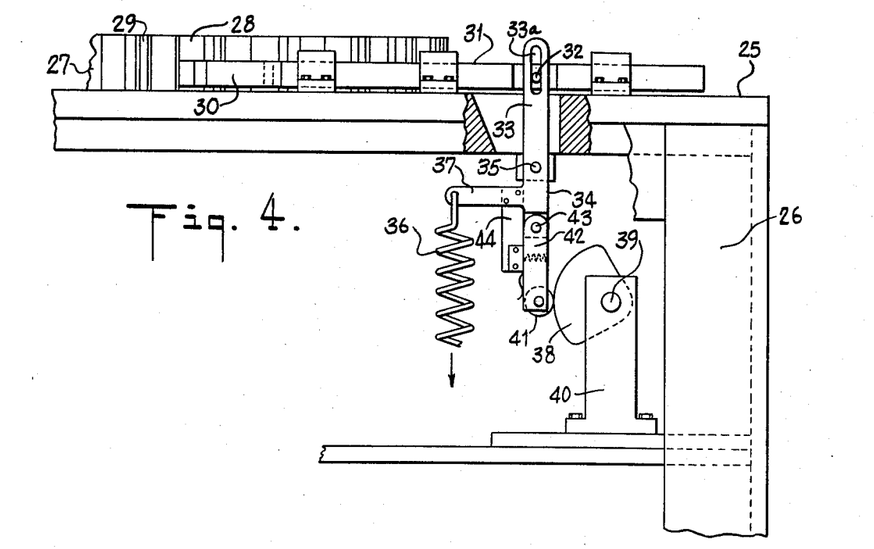
Fig. 4 is a side view in partial section showing certain details of the driving mechanism of the machine illustrated in Fig. 1.

The outer periphery of the work carrying table 27 has ratchet teeth 28 and positioning slots 29 formed therein. In advancing or rotating the work table 27, the ratchet teeth 28 are engaged by a ratchet pawl 30 which is carried on the end of a horizontally reciprocable arm 31. As shown best in Fig. 4, the arm 31 is secured by a pin 32 to slot 33a in the end of an arm 33 of bell crank lever 34. The bell crank lever 34 is pivoted at 35 to the platform 25 and the arm 33 of the lever extends through an opening in the platform.

A spring 36 is secured to the end of an arm 37 of the bell crank lever 34. The spring 36 is under tension which tends to rock the lever 34 in a counterclockwise direction about its pivot point so as to move the arm 31 and the pawl 30 forward which advances the rotatable work carrying table 27 one step in a clockwise direction. A cam 38 controls the forward movement of the pawl 30 under the influence of the spring 36 and returns the arm 31 and the pawl 30 to their initial positions against the force of the spring in proper timed relation to the operation of the machine.

The cam 38 is secured to and driven by a shaft 39 which is journalled in brackets 40 supported on the framework 26. The cam 38 engages with a cam follower 41 which is carried at the end of an arm 42 extending from the bell crank lever 34 in extension of the arm 33. The arm 42 is hinged at 43 to the bell crank lever 34 and is spring urged in a counterclockwise direction. Thus, in the event that a stoppage occurs in the machine that prevents the pawl 30 being moved forward for its full stroke under the influence of the spring 36, the cam 38 as it continues to rotate will leave the cam follower 41 and the hinged arm 42 will be free to be moved in a counterclockwise direction by its spring. This will cause the contacts of a microswitch 44 in a control circuit for the driving mechanism of the machine to open and thereby stop the operation of the machine until the cause of the stoppage is remedied. This arrangement provides a spring drive for advancing the rotatable work table which will not damage or injure the machine if any of the parts of the machine should jam and accidentally prevent movement of the work table.

Figure 1:
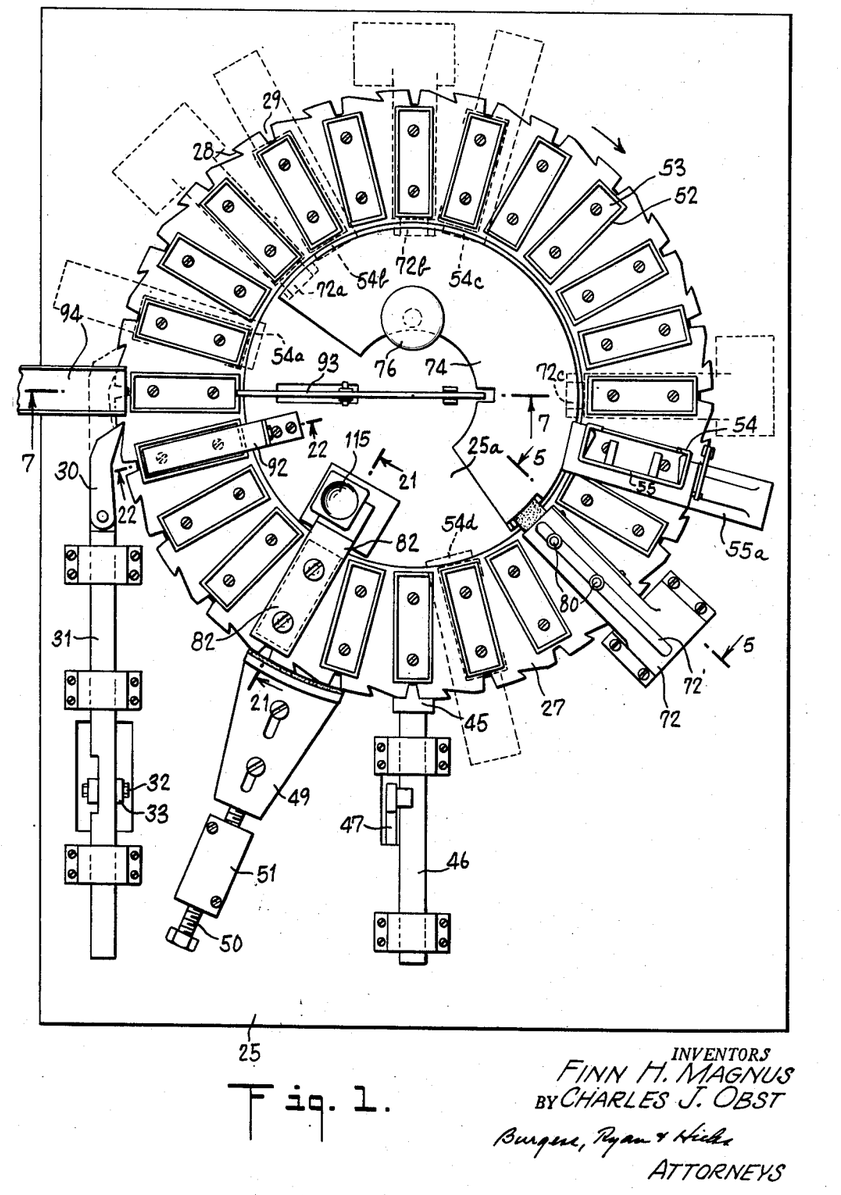
Fig. 1 is a plan view of an assembling machine embodying the invention, but having certain parts eliminated for the purposes of clarity.

When the work carrying table 27 is advanced one step by the forward stroke of the pawl 30 and is at rest for the subsequent operation of the machine, a positioning key 45 engages with one of the positioning slots 29 in the periphery of the work table 27 as shown in Fig. 1. This locks the work table accurately in position for the operations of the machine which are carried out each time the work table is at rest. The positioning key 45 is carried on the end of a horizontally reciprocable member 46 and is moved into and out of locking engagement with the work table by a lever 47 which is moved in proper timed relation to the operation of the machine by a cam 48 on the shaft 39.

An adjustable friction brake 49 is slidably mounted on the platform 25 and may be moved into and out of engagement with the outer periphery of the rotatable work carrying table 27. The frictional engagement of the brake 49 with the work table can be regulated, as desired, by turning a threaded member 50 which is secured to the brake and engages with a bracket 51 on the platform 25. In operation of the machine, the brake 49 is regulated so that it engages the work table to apply sufficient drag to prevent the work table 27 from overrunning a work position when it is advanced one step by the forward stroke of the pawl 30.

The rotatable work carrying table 27 carries a series of radially disposed work holders 52 which are spaced from each other around an annular surface area forming the top of the work table 27. The work holders 52 are positioned so that they will coincide with various other parts of the machine as the assembly operations are carried out when the work table 27 is rotated and is stopped at the work performing positions. The work holders 52 conform in general to the shape of the article to be assembled and those illustrated are generally rectangular in shape with upstanding side walls and are open at the top to receive the parts to be assembled. Each of the work holders 52 has a vertically reciprocable bottom 53 which is moved up and down within the side walls of the holder at proper times in the operation of the machine.

The parts to be assembled are fed to the work holders 52 in the proper sequence and positions with respect to each other from a series of magazines 54, 54a, 54b, 54c and 54d. The magazines are located at spaced points around the work table 27, and since all of the magazines are similar, only the magazine 54 has been shown in full lines while the magazines 54a, 54b, 54c and 54d are indicated by dotted lines in Fig. 1.

Referring now to Figs. 16 through 20, the magazine 54 consists of a chute 55 which is supported on a bracket 55a from the platform 25. The chute 55 is open at its top end so that a number of one of the parts of the assembly may be placed in the chute where they are uniformly stacked in a prearranged relation to each other and to the work holders 52 so that they will be delivered to the work holders in proper relation for assembly with the other parts of the unit being assembled. The bottom part in the chute 55 is normally prevented from passing through an exit at the bottom of the chute by a pair of L-shaped release fingers 56. The L-shaped release fingers 56 are pivotally supported on the bottom of the chute 55, as indicated at 57, and are normally held in a position to block the exit of the chute by a pair of leaf springs 58 so as to support the parts in the chute. This position of the fingers 56 is indicated by the dotted lines in Fig. 20. The bottom part in the magazine 55 is discharged to the work holder 52 that is beneath the magazine by moving the rear legs 56a of the L-shaped fingers toward the rear of the magazine 55. This causes the forwardly extending legs 56b of the fingers to move outwardly against the pressure of the leaf springs 58 and into alignment with the sides of the chute, thus, clearing the exit of the chute.

Figures 18, 19, 20:
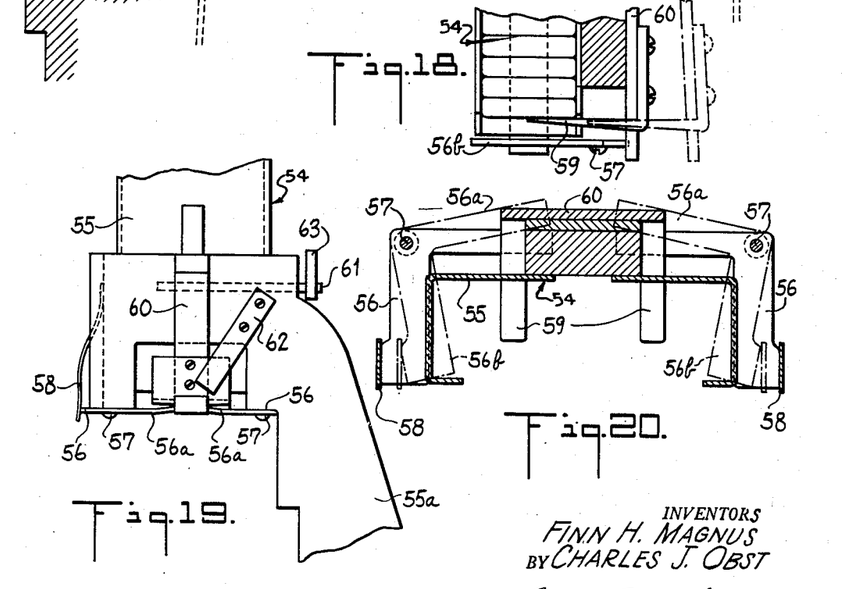
Fig. 18 is a fragmentary view in section taken along the line 18—18 of Fig. 16.
Fig. 19 is a fragmentary view of the feeding mechanism taken from the rear of Fig. 16.
Fig. 20 is a section view taken along the line 20—20 of Fig. 16.

As the L-shaped fingers 56 are moved so as to clear the exit of the chute, a pair of tapered fingers 59 are moved from the dotted line position shown in Fig. 18 to a position where they are interposed between the bottom part in the chute and the part immediately preceding it, as indicated by the full lines in Fig. 18.

The L-shaped release fingers 56 and the tapered fingers 59 are operated in this manner by a movable arm 60 which is secured to a rock shaft 61. The rock shaft 61 is journalled in the upper end of the bracket 55a supporting the chute 55 and the movable arm 60 extends downwardly from the rock shaft to the lower end of the chute 55 where its lower end engages with the rear of the legs 56a of the L-shaped release fingers 56. The tapered fingers 59 are secured to the arm 60 at a suitable distance above its lower end to engage with the next to the bottom part in the chute 55 when they are moved into the chute.

The arm 60 is urged inwardly by a leaf spring 62 (see Fig. 19), but is normally held against such movement by the rock shaft 61 which is connected by a link 63 to an operating rod 64. The operating rod 64 extends through an opening in the platform 25 and is secured to a plate 65. The plate 65 is reciprocated with a generally up and down movement as described hereinafter and the movement imparted to rod 64 causes the shaft 61 to be rocked to release the bottom part from the magazine at the proper time in relation to the operation of the machine.

It will be understood that each of the magazines 54a, 54b, 54c and 54d are constructed and operate in a similar manner. However, other suitable means for feeding the individual parts of the assembly one at a time may be employed in place of the magazines described above. For example, the magazines may be positioned so that the bottom part will be engaged by the rear of the work holder so that it will be slid from beneath the stack of parts in the magazine and dropped into the work holder as the work table is rotated.

Figure 2:
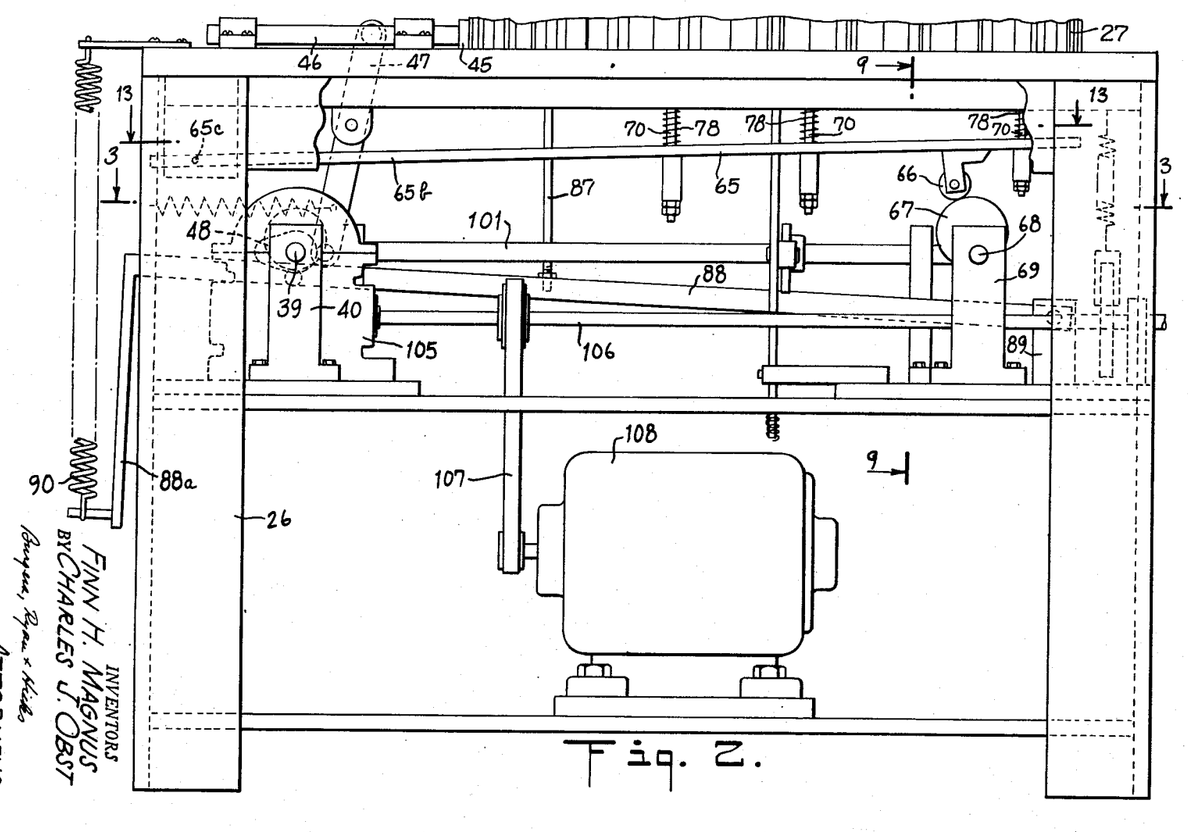
Fig. 2 is a side view of the machine illustrated in Fig. 1.
Figure 13:
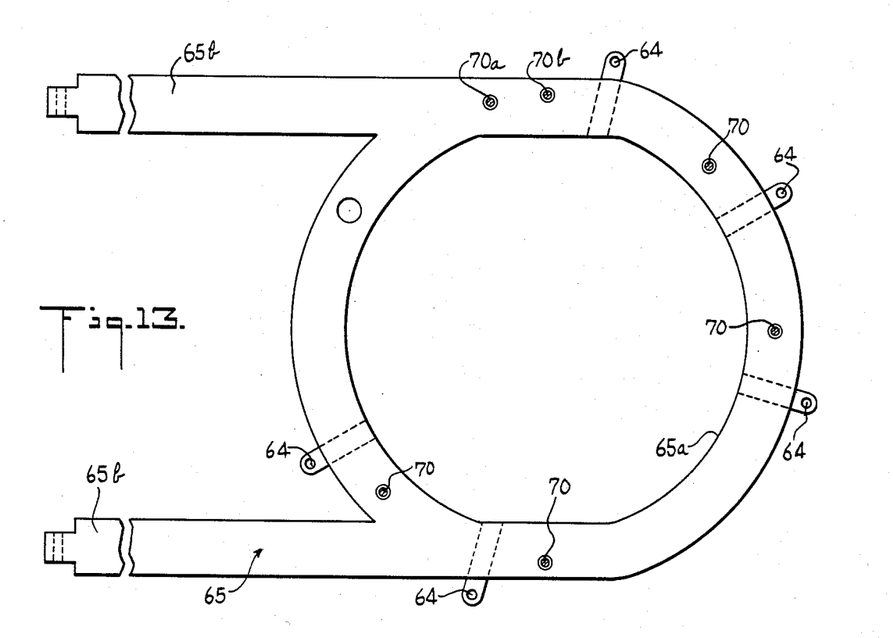
Fig. 13 is a plan view of a portion of the machine as seen from the line 13—13 in Fig. 2.

The plate 65, as shown in Fig. 13, consists of a circular portion 65a which is located beneath the platform 25 and the rotatable work table 27. The plate 65 has legs 65b which are pivoted on a shaft 65c supported at one end of the framework 26 as shown in Fig. 2. The free end of the plate 65 carries a cam follower 66 which engages with a cam 67. The cam 67 is secured to and driven by a shaft 68 which is journalled in brackets 69 supported at the other end of the framework 26. The cam 67 is designed to raise and lower the plate 65 in proper timed relation to the operation of the machine. This occurs while the rotatable work table is at rest and in addition to releasing the bottom part from each magazine to the work holder positioned beneath each magazine, it also performs other operations as will now be described.

Figure 5:
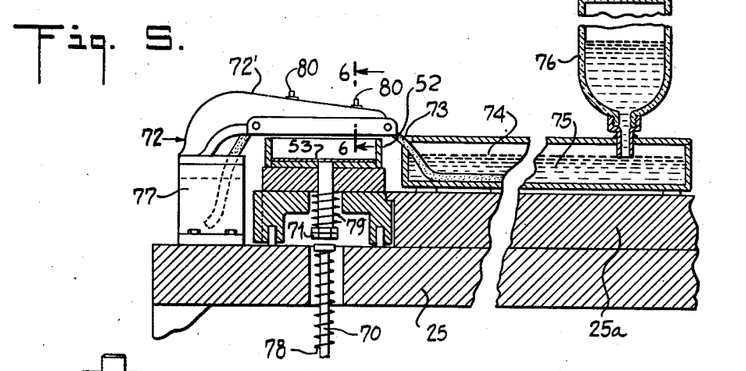
Fig. 5 is a section view taken along the line 5—5 of Fig. 1.

In addition to the magazine operating rods 64, the plate 65 carries a series of upwardly extending rods 70 which also extend through openings in the platform 25. As the plate 65 is raised, the rods 70 are brought into engagement with studs 71 extending downwardly from the movable bottoms 53 of the work holders 52 as shown in Fig. 5. The rods 70 are positioned beneath the work table 27 at positions of the work holders 52 intermediate the positions where the magazines are located.

A mechanism 72 for applying an adhesive or solvent to the top surface of the last part fed to the work holders 52 is supported from the platform 25 by a bracket 72' above each of the work holders at such intermediate positions. Thus, an applicator mechanism is located at positions of the work holders between the magazines 54a and 54b; 54b and 54c; 54c and 54; and 54 and 54d as indicated in dotted lines at 72a, 72b and 72c and in full lines at 72 in Fig. 1. Each of the applicator mechanisms is similar and the construction and operation of one such mechanism will now be described.

As shown best in Fig. 5, the bracket 72' extends over the open top of the work holder 52 and supports a wick 73 or felt or other suitable material in a position directly above the last part to be placed in the work holder 52. One end of the wick 73 extends into a central reservoir 74 which is common to all of the applicator mechanisms and contains a supply 75 of an adhesive or solvent in liquid form. The central reservoir 74 is supported on the top of the central member 25a and is arcuate in shape with slotted openings along its outer edges to receive the wicks 73 of the various applicator mechanisms. The liquid 75 in the reservoir 74 may be maintained at a desired level from a supply in a container 76 which is supported in inverted position with its spout extending into the reservoir 74.

The other end of the wick 73 extends into a reservoir 77 in the foot portion of the bracket 72' which also contains a supply of the adhesive or solvent 74. By having both ends of the wick 73 immersed in the liquid solvent or adhesive, the presence of adequate supply of the adhesive or solvent at the portion of the wick 73 disposed above the work holder 52 is insured.

The particular embodiment of the invention which is illustrated and described herein is designed to assemble the various parts of a plastic harmonica which are molded from a material such as polystyrene. In such case, the opposing surfaces of the parts forming the assembly may be bonded and joined together by applying a suitable solvent such as coal tar hydrocarbons or chlorinated hydrocarbons to one of the surfaces of one part and then pressing the opposing surface of the next part against such surface. It will, of course, be understood that parts made of other materials and joined together by other adhesives or solvents may be assembled in a like manner.

Figures 14, 15:
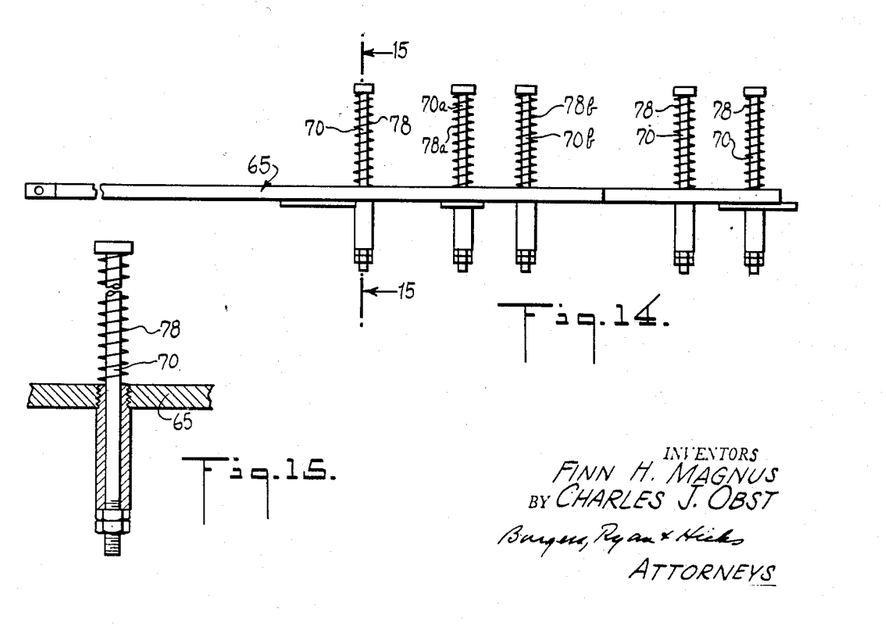
Fig. 14 is a side view of the portion of the machine illustrated in Fig. 13.
Fig. 15 is a section view taken along the line 15—15 of Fig. 14.
Figure 16:
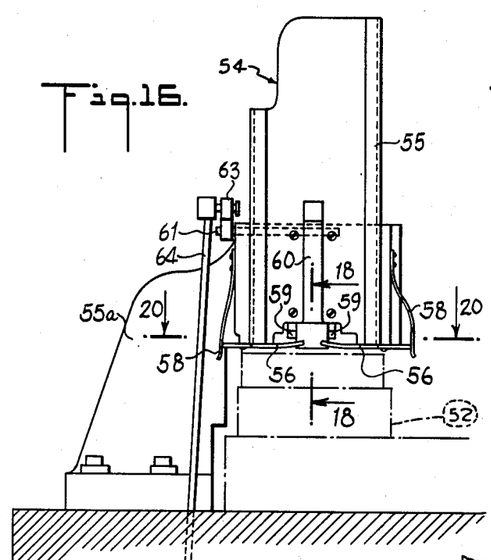
Fig. 16 is a front view showing certain details of the feeding mechanism of the machine illustrated in Fig. 1 on an enlarged scale.
Figure 17:
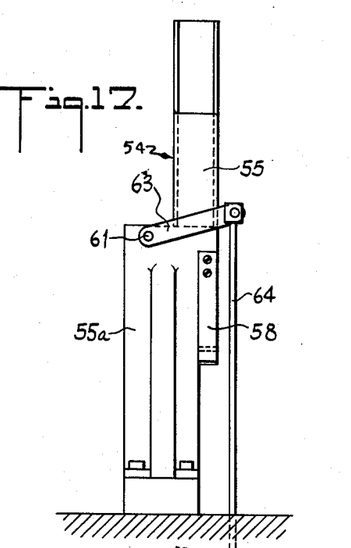
Fig. 17 is a side view of the feeding mechanism illustrated in Fig. 16.

When the cam 67 raises the plate 65 so as to bring the rods 70 into engagement with the studs 71, the bottoms 53 of the work holders 52 and the parts supported therein are raised to bring the top surface of the last part fed to each work holder into contact with the wicks 73 to receive an application of the solvent 74. The rods 70 are slidably supported on the plate 65 and are yieldably held in their extended position by springs 78 as shown in Figs. 14 and 15. Thus, if the movable bottoms 53 of the work holders 52 should become stuck or their upward movement should be prevented for any reason, the rods 70 will yield while the plate 65 continues to move. This will prevent damage to the work holders in such event.

A spring 79 surrounding the shank of the stud 71 is compressed upon upward movement of the stud 71 and serves to return the stud and the bottom 53 of the work holder to their initial position as the plate 65 and the rods 70 are lowered.

Figure 6:
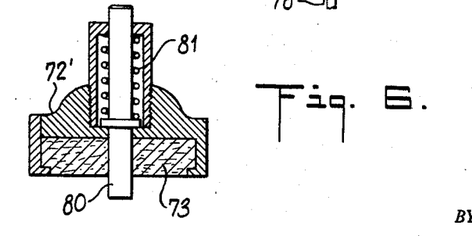
Fig. 6 is a section view taken along the line 6—6 of Fig. 5.

As shown best in Fig. 6, as the part to which the adhesive or solvent is being applied is raised, its top surface engages with the lower ends of release pins 80 which are slidably mounted in the bracket 72' and extend through the wick 73. The upward movement of the release pins 80 compresses springs 81 so that when the bottom 53 of the work holder 52 moves down, the release pins 80 under the influence of the springs 81 force the part contacting the wick from the surface of the wick 73. This will prevent the parts from accidentally sticking to the wick.

After the final part of the assembled unit is deposited in the work holder 52 by the last magazine 54d, a coating of the adhesive or solvent will be disposed between the opposing surfaces of the parts forming the assembly. Before the adhesive or solvent has had sufficient time to set permanently, the parts of the assembled unit are brought into final alignment with each other by an aligning box 82 at a subsequent position of the work table. As shown best in Fig. 21, the aligning box 82 is supported from the center member 25a by a bracket 83. The aligning box 82 contains a vertically movable aligning plate 84. The lower surface of the aligning plate 84 may be shaped to fit the contour of the exterior of the final or top part of the assembly. The aligning plate 84 is movably supported in the aligning box 82 by studs 85 and is resiliently urged into engagement with the top of the assembly by compression springs 86.

Figure 3:
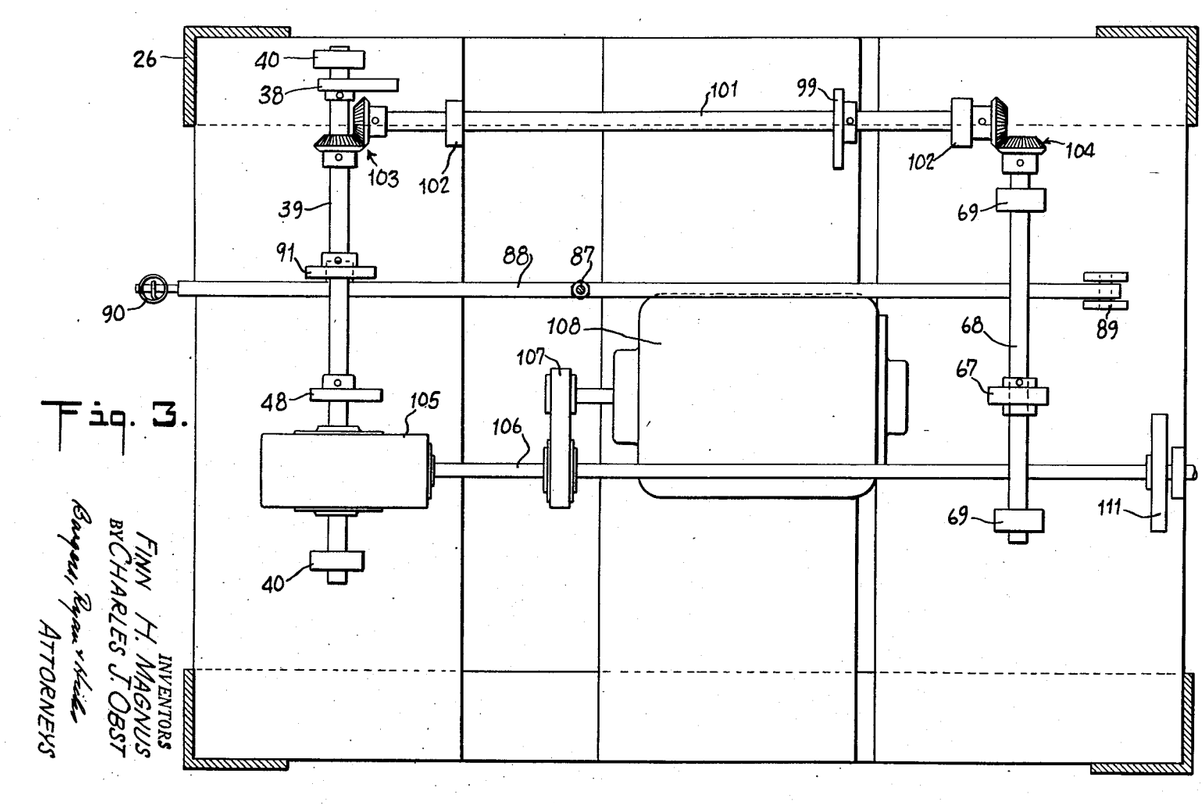
Fig. 3 is a section view taken along the line 3—3 of Fig. 2.

When the work holder 52 containing an assembled unit reaches the position beneath the aligning box 82, a rod 87 carried on a pivoted lever 88 is brought into engagement with the stud 71 extending from the movable bottom of such work holder 52. As shown best in Figs. 2 and 3, the lever 88 is pivoted on a shaft journalled in a bracket 89 supported at one end of the framework 26 and is urged in an upward direction by a heavy tension spring 90 which is secured between an offset portion 88a at the free end of the lever 88 and the top of the framework 26. The rod 87 which moves the bottom of the work holder upward at the aligning position is secured intermediate the ends of the lever 88 and extends through an opening in the platform 25 so that when the lever 88 is moved upwardly by the spring 90, the end of the rod 87 is brought into engagement with the stud 71 to move the bottom 53 of the work holder 52 upward. This forces the assembly upwardly into the aligning box 82 and the edges of the parts of the assembly are brought into alignment by the sides of the aligning box 82. Pressure is also exerted against the parts so as to force the opposing surfaces of the parts into intimate contact. The movement of the lever 88 by the spring 90 is controlled by a cam 91 on the shaft 39 in appropriate timing with respect to operation of the machine. This operation is also spring activated so that no damage or injury will occur if the parts should not operate properly for any reason.

The parts forming the assembly are finally squeezed together once more at a position of the work table following the aligning position to insure that the opposing surfaces of the parts are in firm contact in the event that they may have been shifted relative to each other during their alignment. At this position of the work table, there is a rigid bracket 92 which is supported on the central member 25a and extends over the work holder 52. As shown best in Fig. 22, a rod 70a (which is similar in construction and operation to the rods 70) is carried on the pivoted plate 65 and is held in extended position by a spring 78a. The rod 70a engages with the stud 71 of the work holder 52 at this position by the movement of the plate 65 as previously described and on its upward stroke, it forces the assembled unit against the rigid bracket 92.

After the final squeezing together of the parts forming the assembled unit, the unit is ejected from the work holder at a subsequent position of the work table. At this position of the work table, the assembled unit is raised so that it is clear of the work holder 52, as indicated by the dotted lines in Fig. 7, by a rod 70b which is carried on the pivoted plate 65. The rod 70b is held in extended position by a spring 78b and is similar in its operation and construction to the rods 70. When the assembled unit is raised clear of the sides of the work holder 52, the end of an ejector rod 93 strikes one end of the unit and discharges it outwardly from the work table into a downwardly inclined chute 94.

The ejector rod 93 is slidably supported at one end on a bracket 95 which is secured to the central member 25a and is reciprocated toward and away from the assembled unit by a lever 96 to which it is pinned. The lever 96 is pivoted at 97 on the framework 26 and is rocked about its pivot point to bring the ejector rod 93 into engagement with the assembled unit by a tension spring 98. This movement of the lever 96 is controlled by a cam 99 in proper timing with respect to the operation of the machine. The cam 99 engages with a cam follower 100 on an arm 96a extending from the lever 96 and is secured to a shaft 101 which is journalled in brackets 102 supported on the framework 26.

The shaft 101 is driven from the shaft 39 by bevel gears 103 and in turn drives the shaft 68 (on which the cam 67 for moving the plate 65 up and down is secured) through bevel gears 104. The shaft 39 is driven through a speed reducing gear box 105 by a shaft 106 which is driven through a belt 107 by an electric motor 108.

Figure 9:
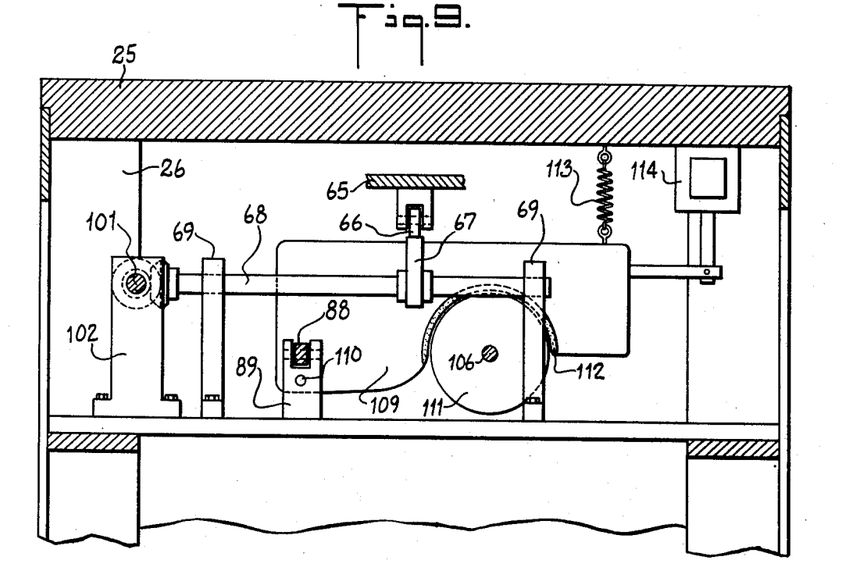
Fig. 9 is a section view taken along the line 9—9 of Fig. 2.

As shown best in Fig. 9, a solenoid operated brake is provided for stopping the machine in case of an emergency. The solenoid operated brake consists of a brake member 109 which is pivoted at 110 on the bracket 89 in a position where it extends over a drum 111 secured to the belt driven drive shaft 106. The movable brake member 109 is shaped to fit around a part of the circumference of the drum 111 and carries a friction lining 112 which engages with the drum 111 when the brake is applied. The movable brake member 109 is normally held out of engagement with the drum 111 by a spring 113 and is moved into engagement with it by a solenoid 114. A push button switch 115 for operating the solenoid is mounted on the aligning box 82 (see Fig. 21) where it may be easily reached by an operator to stop the operation of the machine quickly when desired.

Figures 21, 22, 23:
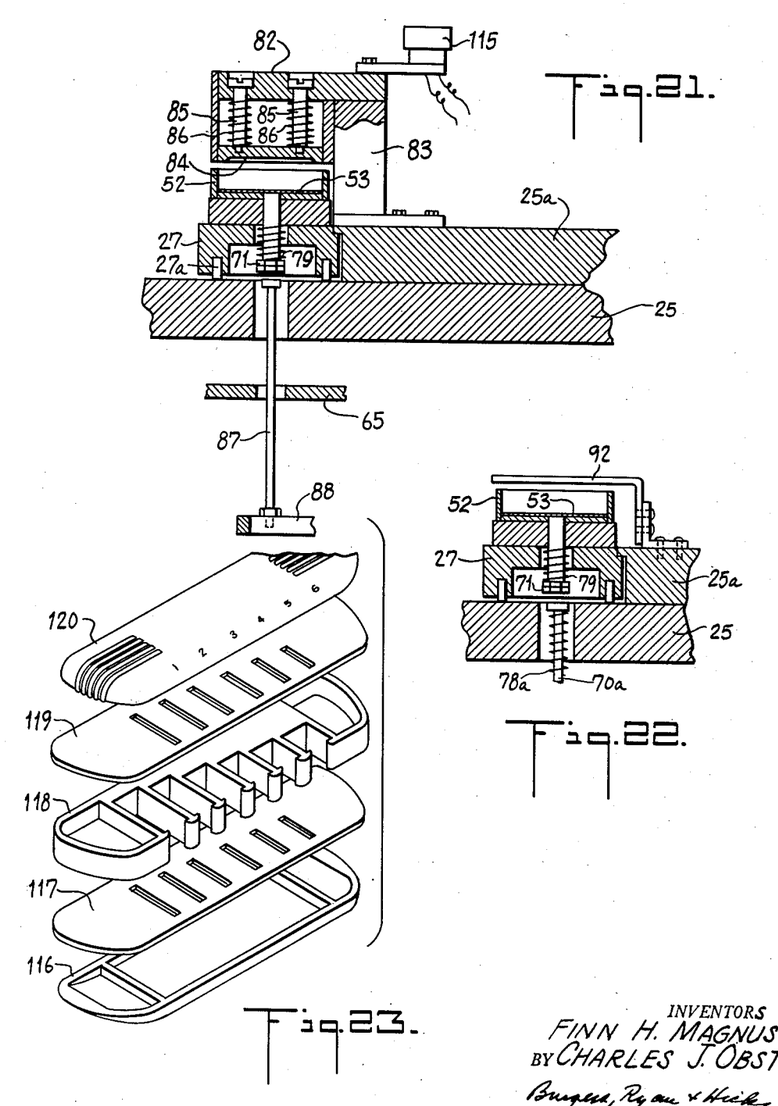
Fig. 21 is a section view taken along the line 21—21 of Fig. 1.
Fig. 22 is a section view taken along the line 22—22 of Fig. 1.
Fig. 23 is an exploded view in perspective of the parts of a harmonica which are assembled by the machine illustrated in Fig. 1.

As previously mentioned, the particular parts being assembled by the embodiment of the invention illustrated and described herein are the parts of a plastic harmonica. As shown in Fig. 23, the harmonica consists of a bottom cover 116, a bottom reed plate 117, a comb section 118, a top reed plate 119 and a top cover 120.

The sequence of operations carried out by the machine will now be briefly described once more. The bottom cover 116 is placed in one of the work holders by the magazine 54a as the work holder stops momentarily at a position beneath this magazine. The solvent is then applied to the upper surfaces of the bottom cover 116 by the applicator mechanism at a following position of the work table. The bottom reed plate 117 is then placed on top of the bottom cover 116 in the work holder by the magazine 54b at a following position of the work table. The solvent is applied to the top surface of the bottom reed plate 117 by the applicator mechanism 72b at a subsequent position of the work table. The comb section 118 is then placed on top of the bottom reed plate 117 in the work holder 52 by the magazine 54c and solvent is applied to the top surface of the comb section by the applicator mechanism 72c at subsequent positions of the work table. The top reed plate 119 is placed on top of the comb section 118 by the magazine 54 and solvent is applied to the top surface thereof by the applicator mechanism 72 at still subsequent positions of the work table. The top cover 120 is then placed on top of the top reed plate 119 by the magazine 54d at another position of the work table. The parts comprising the assembly are then aligned by the aligning box 82 and are then finally squeezed together by the bracket 92 before being ejected from the work holder 52 into the chute 94 at other positions of the work table. It will be understood that the various operations mentioned above are being simultaneously carried out at the various positions of the work table each time it stops momentarily.

Figures 7, 8:
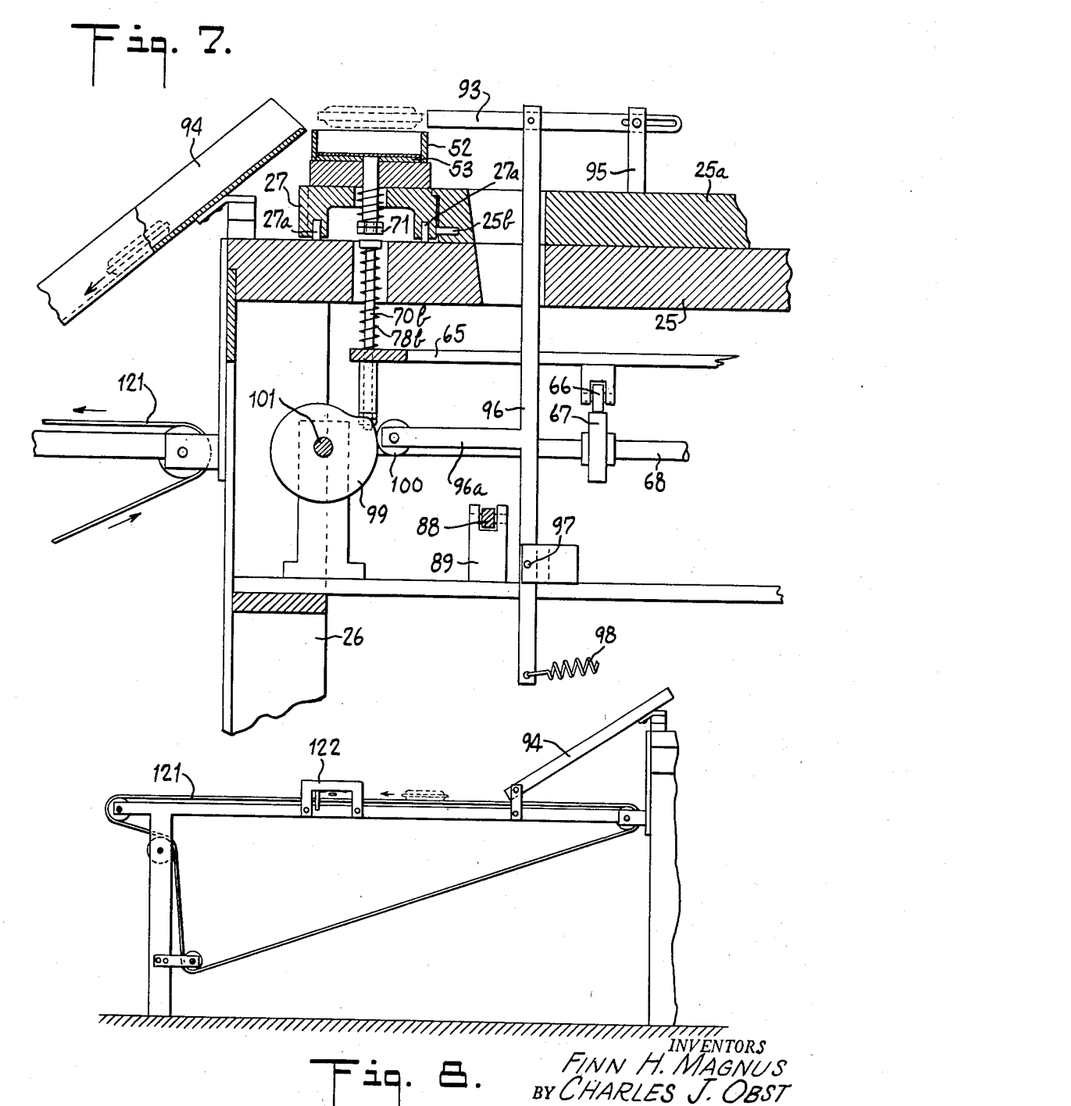
Fig. 7 is a section view taken along the line 7—7 of Fig. 1.
Fig. 8 is a side view showing conveyor and checking mechanisms which are located at the left of machine illustrated in Fig. 1.

The assembled unit falls down the chute 94 by gravity onto a moving conveyor belt 121 as shown in Figs. 7 and 8. The conveyor belt 121 delivers the assembled units to a packaging machine but before doing so carries them through an inspection or checking device 122.

Figures 10, 11:
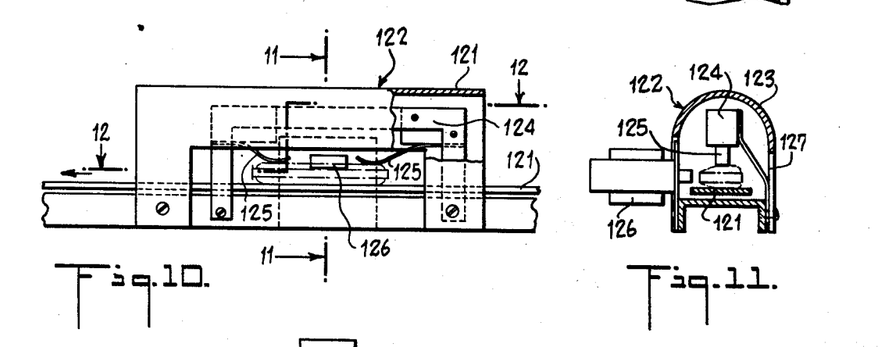
Fig. 10 is a side view in partial section showing certain details of the checking mechanism illustrated in Fig. 8 on an enlarged scale.
Fig. 11 is a section view taken along the line 11—11 of Fig. 10.
Figure 12:
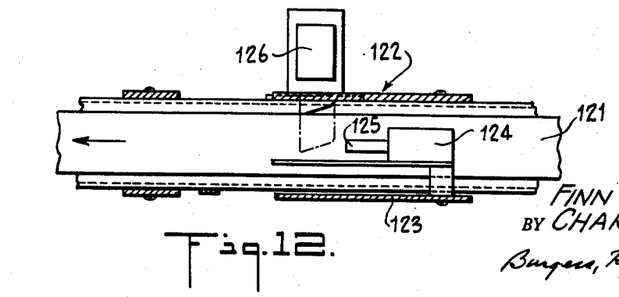
Fig. 12 is a section view taken along the line 12—12 of Fig. 10.

As shown best in Figs. 10 to 12, the inspection or checking device consists of a housing or chamber 123 through which the assembled unit is carried by the conveyor belt 121. A pair of microswitches 124 are supported inside of the chamber 123 with their feelers 125 positioned to engage with the top of the assembled unit. If the feelers 125 are not raised to a distance sufficient to close the contacts of their respective switches 124 as an assembled unit passes beneath them, a solenoid 126 is operated to eject the unit from the belt 121 through an opening 127 in the side of the chamber 123 into a reject bin. For example, this will occur when all of the parts are not included in the final assembly. Otherwise, the final assembly continues to the packaging machine.

It will be understood that the machine illustrated and described herein may be readily adapted to assembling articles of various shapes and with practically any number of separate parts by using suitably shaped work holders and a suitably shaped aligning box and by employing a suitable number of magazines and solvent or adhesive applicator mechanisms. It will also be understood that various changes and modifications may be made in the machine illustrated and described herein without departing from the scope of the invention as defined by the following claims.

We claim:

1. In an automatic assembling apparatus, the combination of a movable work table, drive means for advancing said work table to a series of spaced positions in a step by step movement, a series of work holders carried by said work table, each of said work holders being shaped to receive parts of a structure in position for assembly and having a vertically reciprocable bottom, a series of magazines located above the work holders at spaced positions about the work table, each of said magazines containing a supply of one part of the structure and being operable upon movement of the work table to release one of said parts to the work holder at said position, means for applying a bonding material to one of the opposing surfaces of parts fed to the work holders, said means being located intermediate the adjacent magazines of said series of magazines and means for aligning the parts fed to the work holders and having a bonding material between their opposing surfaces.

2. In an automatic assembling machine, the combination of a movable work table, drive means for advancing said work table to a series of spaced positions in a step by step movement, a series of work holders carried by said work table, said work holders being shaped to receive and hold parts of an article in position for assembly, said work holders having openings at the top thereof and a vertically reciprocable bottom, a series of magazines for feeding parts of the article to the work holders, each of said magazines containing a supply of one of the parts of the article and being supported above the work holders in spaced relation to each other around the work table, means for applying a bonding material to the surface of a part fed to the work holder which opposes and contacts with a surface of another part of the article, said last-mentioned means including an applicator pad saturated with the bonding material supported above the work holders and located intermediate adjacent magazines of said series of magazines, intermittently operated means for reciprocating the bottoms of the work holders to bring the upper surface of the top part therein into contact with the applicator pad and means for aligning the parts of the article with the bonding material between the opposing surfaces thereof.

3. In an automatic assembling machine, the combination as defined in claim 2 wherein said drive means for advancing the work table includes a ratchet and pawl for intermittently advancing the work table and a spring connected to and activating the ratchet and pawl in advancing the work table.

4. In an automatic assembling machine, the combination of a movable work table, drive means for advancing said work table to a series of spaced positions in a step by step movement, a series of work holders carried by said work table, said work holders being shaped to receive and hold parts of an article in position for assembly, said work holders having openings at the top thereof and a vertically reciprocable bottom, a series of magazines supported above the work holders in spaced relation to each other around the work table, each of said magazines containing a supply of one of the parts of the article for feeding the same to the work holders, means for applying a bonding material to the surface of a part fed to the work holder which opposes and contacts with a surface of another part of the article, said last-mentioned means including an applicator pad saturated with the bonding material supported above the work holders and located intermediate adjacent magazines of said series of magazines, intermittently operated means for reciprocating the bottoms of the work holders to bring the upper surface of the top part therein into contact with the applicator pad, means for aligning the parts of the article with the bonding material between the opposing surfaces thereof, and means for clamping the aligned parts of the article together under pressure.

5. In an automatic assembling machine, the combination of a movable work table, drive means for advancing said work table to a series of spaced positions in a step by step movement, a series of work holders carried by said work table, said work holders being shaped to receive and hold parts of an article in position for assembly, said work holders having openings at the top thereof and a vertically reciprocable bottom, a series of magazines supported above the work holders in spaced relation to each other around the work table, each of said magazines containing a supply of one of the parts of the article for feeding the same to the work holders, means for applying a bonding material to the surface of a part fed to the work holder which opposes and contacts with a surface of another part of the article, said last-mentioned means including an applicator pad saturated with the bonding material supported above the work holders and located intermediate adjacent magazines of said series of magazines, intermittently operated means for reciprocating the bottoms of the work holders to bring the upper surface of the top part therein into contact with the applicator pad, means for aligning the parts of the article with the bonding material between the opposing surfaces thereof, means for clamping the aligned parts of the article together under pressure and means for ejecting assembled articles from the work holders.

6. In an automatic assembling machine, the combination of a movable work table, drive means for advancing said work table in a step by step movement to a plurality of spaced positions, a series of work holders carried by said work table, said work holders being shaped to receive and hold parts of an article in position for assembly, said work holders having openings at the tops thereof and a vertically reciprocable bottom, a series of magazines supported above the work holders in spaced relation to each other around the work table, each of said magazines containing a supply of one of the parts of the article for feeding the same to the work holders at spaced positions of the work table, means for applying a bonding material to the top surface of parts in the work holder, said last-mentioned means including an applicator pad saturated with the bonding material supported above the work holders and being located intermediate adjacent magazines of said series of magazines, intermittently operated means for reciprocating the bottoms of the work holders to bring the upper surface of the top part therein into contact with the applicator pad, means for aligning the parts of the article with the bonding material between their opposing surfaces, said aligning means being located at a position of the work table spaced from the final magazine, means for clamping the opposing surfaces of the aligned parts of the article together under pressure, said clamping means being located at a position of the work table spaced from the aligning means, means for ejecting assembled articles from the work holders and means for locking the work table with the work holders thereon in each of the spaced positions thereof to which it is moved.

7. In an assembling apparatus, the combination of a rotatable work table, drive means for rotating said table in a step by step movement to a plurality of spaced positions, a series of work holders carried in spaced relation to each other on said table for rotation therewith, said work holders being shaped to receive and hold a number of parts of an article in position for assembly and having openings at the top thereof and vertically reciprocable bottoms, a series of magazines supported above said work holders at spaced positions of the work table, each of said magazines containing a supply of one of the parts of the article for feeding the same to the work holder beneath said magazine, an applicator pad carrying a bonding material supported above said work holders at positions intermediate adjacent magazines of said series of magazines and yieldable means positioned for engagement with the vertically reciprocable bottoms of the work holders at positions of the work table beneath said applicator pads, means for intermittently actuating said yieldable means to move said bottoms and the parts supported thereon upward to bring the upper surface of the top part in the work holder into contact with the applicator pad positioned thereabove.

8. In an assembling apparatus, the combination of a rotatable work table, drive means for rotating said table in a step by step movement to a plurality of spaced positions, a series of work holders carried in spaced relation to each other on said table for rotation therewith, said work holders being shaped to receive and hold a number of parts of an article in position for assembly and having openings at the top thereof and vertically reciprocable bottoms, a series of magazines supported above said work holders at spaced positions of the work table, each of said magazines containing a supply of one of the parts of the article for feeding the same to the work holder beneath said magazine, an applicator pad carrying a bonding material supported above the work holders at positions intermediate adjacent magazines of said series of magazines, yieldable means positioned for engagement with the vertically reciprocable bottoms of the work holders at positions of the work table beneath each of said applicator pads, means connected to the drive means for intermittently actuating said yieldable means to move said bottoms and the parts supported thereon upwardly to bring the upper surface of the top part in the work holder into contact with one of the applicator pads, an aligning member supported above one of the work holders at a position of the work table following the final magazine and spring actuated means engaging with the bottom of the work holder at said last-mentioned position for bringing the parts of the article in said work holder into engagement with the aligning member.

9. In an assembling apparatus, the combination of a rotatable work table, drive means for rotating said table in a step by step movement to a plurality of spaced positions, a series of work holders carried in spaced relation to each other on said table for rotation therewith, said work holders being shaped to receive and hold a number of parts of an article in position for assembly and having openings at the top thereof and vertically reciprocable bottoms, a series of magazines supported above said work holders at spaced positions of the work table, each of said magazines containing a supply of one part of the article for feeding the same to the work holder beneath said magazine, an applicator pad carrying a bonding material supported above the work holders at positions intermediate adjacent magazines of said series of magazines, yieldable means positioned for engagement with the vertically reciprocable bottoms of the work holders at positions of the work table beneath each of said applicator pads, means connected to the drive means for intermittently actuating said yieldable means to move said bottoms and the parts supported thereon upwardly to bring the upper surface of the top part in the work holder into contact with one of the applicator pads, an aligning member supported above one of the work holders at a position of the work table following the final magazine, spring actuated means engaging with the bottom of the work holder at said last-mentioned position for bringing the parts of the article in said work holder into engagement with the aligning member, and ejector means for discharging an assembled article from one of the work holders at a position of the work table following the aligning position thereof.

10. In an assembling apparatus, the combination of a rotatable work table, drive means for rotating said table in a step by step movement to a plurality of spaced positions, a series of work holders carried in spaced relation to each other on said table for rotation therewith, said work holders being shaped to receive and hold a number of parts of an article in position for assembly and having openings at the top thereof and vertically reciprocable bottoms, a series of magazines supported above said work holders at spaced positions of the work table, each of said magazines containing a supply of one of the parts of the article for feeding the same to the work holder beneath said magazine, an applicator pad carrying a bonding material supported above the work holders at positions intermediate adjacent magazines of said series of magazines, yieldable means positioned for engagement with the vertically reciprocable bottoms of the work holders at positions of the work table beneath each of said applicator pads, means for intermittently actuating said yieldable means to move said bottoms and the parts supported thereon upwardly to bring the upper surface of the top part in the work holder into contact with one of the applicator pads positioned thereabove and simultaneously operating the magazines to release parts to the work holders positioned therebeneath, an aligning member supported above one of the work holders at a position of the work table following the final magazine, spring actuated means engaging with the bottom of the work holder at said last-mentioned position for bringing the parts of the article in said work holder into engagement with the aligning member, ejector means for discharging an assembled article from one of the work holders at a position of the work table following the aligning position thereof and means for checking the thickness of an assembled article after discharge from said work holders.

11. In an assembling apparatus, the combination of a rotatable work table, drive means for rotating said table in a step by step movement to a plurality of spaced positions, a series of work holders carried in spaced relation to each other on said table for rotation therewith, said work holders being shaped to receive and hold a number of parts of an article in position for assembly and having openings at the top thereof and vertically reciprocable bottoms, a series of magazines supported above said work holders at a number of the spaced positions of the work table, each of said magazines containing a supply of one of the parts of the article, an applicator pad carrying a bonding material supported above said work holders at positions intermediate adjacent magazines of said series of magazines, yieldable means positioned for engagement with the vertically reciprocable bottoms of the work holders at positions of the work table beneath each of said applicator pads, means connected to the drive means for intermittently actuating said yieldable means to move said bottoms and the parts supported thereon upwardly to bring the upper surface of the top part in the work holder into contact with one of the applicator pads positioned thereabove, an aligning member supported above one of the work holders at a position of the work table following the final magazine, spring actuated means engaging with the bottom of the work holder at said last-mentioned position for bringing the parts of the article in said work holder into engagement with the aligning member, a clamping member supported above one of the work holders at a position following said aligning position and means at said clamping position for moving the bottom of the work holder and the aligned parts of the article supported thereon upward and into engagement with said clamping member.

12. In an assembling apparatus, the combination of a rotatable work table, drive means for rotating said table in a step by step movement to a plurality of spaced positions, a series of work holders carried in spaced relation to each other on said table for rotation therewith, said work holders being shaped to receive and hold a number of parts of an article in position for assembly and having openings at the top thereof and vertically reciprocable bottoms, a series of magazines supported above said work holders at a number of the spaced positions of the work table, each of said magazines containing a supply of one of the parts of the article, an applicator carrying a bonding material supported above said work holders at positions intermediate adjacent magazines of said series of magazines, yieldable means positioned for engagement with the vertically reciprocable bottoms of the work holders at positions of the work table beneath each of said applicators, means for actuating said yieldable means to move said bottoms and the parts supported thereon upwardly to bring the upper surface of the top part in the work holder into contact with one of the applicators, an aligning member supported above one of the work holders at a position of the work table following the final magazine, spring actuated means engaging with the bottom of the work holder at said last-mentioned position for bringing the parts of the article in said work holder into engagement with the aligning member, a clamping member supported above one of the work holders at a position following said aligning position, means at said clamping position for moving the bottom of the work holder and the aligned parts of the article supported thereon upward and into engagement with said clamping member and ejector means for discharging assembled articles from the work holders, said ejector means being located at a position of the work table following said clamping position.

13. In an assembling apparatus, the combination of a rotatable work table, drive means for rotating said table in a step by step movement to a plurality of spaced positions, a series of work holders carried in spaced relation to each other on said table for rotation therewith, said work holders being shaped to receive and hold a number of parts of an article in position for assembly and having openings at the top thereof and vertically reciprocable bottoms, a series of magazines supported above said work holders at a number of the spaced positions of the work table, each of said magazines containing a supply of one of the parts of the article, an applicator carrying a bonding material supported above said work holders at positions intermediate adjacent magazines of said series of magazines, yieldable means positioned for engagement with the vertically reciprocable bottoms of the work holders at positions of the work table beneath each of said applicators, means for actuating said yieldable means to move said bottoms and the parts supported thereon upwardly to bring the upper surface of the top part in the work holder into contact with one of the applicators, an aligning member supported above one of the work holders at a position of the work table following the final magazine, spring actuated means engaging with the bottom of the work holder at said last-mentioned position for bringing the parts of the article in said work holder into engagement with the aligning member, a clamping member supported above one of the work holders at a position following said aligning position, means at said clamping position for moving the bottom of the work holder and the aligned parts of the article supported thereon upward and into engagement with said clamping member, ejector means for discharging assembled articles from the work holders, said ejector means being located at a position of the work table following said clamping position, and means for checking the thickness of articles discharged from said work holders.

14. In an assembling apparatus, the combination of a rotatable work table, drive means for rotating said table in a step by step movement to a plurality of spaced positions, a series of work holders carried in spaced relation to each other on said table for rotation therewith, said work holders being shaped to receive and hold a number of parts of an article in position for assembly and having openings at the top thereof and vertically reciprocable bottoms, a series of magazines supported above said work holders at a number of the spaced positions of the work table, each of said magazines containing a supply of one of the parts of the article, an applicator carrying a bonding material supported above said work holders at positions intermediate adjacent magazines of said series of magazines, yieldable means positioned for engagement with the vertically reciprocable bottoms of the work holders at positions of the work table beneath each of said applicators, means for actuating said yieldable means to move said bottoms and the parts supported thereon upwardly to bring the upper surface of the top part in the work holder into contact with the applicator positioned thereabove, an aligning member supported above one of the work holders at a position of the work table following the final magazine, spring actuated means engaging with the bottom of the work holder at said last-mentioned position for bringing the parts of the article in said work holder into engagement with the aligning member, a clamping member supported above one of the work holders at a position following said aligning position, means at said clamping position for moving the bottom of the work holder and the aligned parts of the article supported thereon upwardly and into engagement with said clamping member, ejector means for discharging assembled articles from the work holders, said ejector means being located at a position of the work table following said clamping position, and means periodically engaging with and holding the work table against movement thereof, said last-mentioned means positioning the work table at the positions to which it is advanced.

15. In an assembling apparatus, the combination of a rotatable work table, drive means for rotating said table to a series of positions in a step by step movement, a series of work holders carried in spaced relation to each other on said work table, each of said work holders being shaped to receive and hold a number of parts of an article in position for assembly and having an open top and a vertically reciprocable bottom to receive and support parts of the article being assembled therein, a plate supported beneath said work table, said plate being vertically reciprocable with respect to said work table, members yieldably supported on said plate in position for engagement with the bottoms of the work holders at spaced positions of the work table and means connected to the drive means for intermittently reciprocating said plate.

16. In an assembling apparatus, the combination of a rotatable work table, drive means for rotating said table to a series of positions in a step by step movement, a series of work holders carried in spaced relation to each other on said work table, each of said work holders being shaped to receive and hold a number of parts of an article in position for assembly and having an open top and a vertically reciprocable bottom to receive and support parts of the article being assembled therein, a plate supported beneath said work table, said plate being vertically reciprocable with respect to said work table, members yieldably supported on said plate in position for engagement with the bottoms of the work holders at spaced positions of the work table, means connected to the drive means for intermittently reciprocating said plate, a bracket supported above the work holder at at least one of said last-mentioned positions of the work table and a wick containing a bonding material supported by said bracket above the top of the work holder at said last-mentioned position of the work table.

17. In an assembling apparatus, the combination of a rotatable work table, drive means for rotating said table to a series of positions in a step by step movement, a series of work holders carried in spaced relation to each other on the work table, each of said work holders being shaped to receive and hold a number of parts of an article in position for assembly and having an open top and a vertically reciprocable bottom to receive and support parts of the article being assembled therein, a plate supported beneath said work table, said plate being vertically reciprocable with respect to said work table, members yieldably supported on said plate in position for engagement with the bottoms of the work holders at spaced positions of the work table upon upward movement of said plate, means connected to the drive means for intermittently reciprocating said plate, a bracket supported above the work holder at at least one of the last-mentioned positions of the work table and a wick supported by said bracket above the open top of the work holder at said last-mentioned position of the work holder, said wick having at least one end thereof extending into a supply of a bonding material in liquid form.

18. In an assembling apparatus, the combination of a rotatable work table, drive means for rotating said table to a series of positions in a step by step movement, a series of work holders carried in spaced relation to each other on the work table, each of said work holders being shaped to receive and hold a number of parts of an article in position for assembly and having an open top and a vertically reciprocable bottom to receive and support parts of the article being assembled therein, a plate supported beneath said work table, said plate being vertically reciprocable with respect to said work table, members yieldably supported on said plate in position for engagement with the bottoms of the work holders at spaced positions of the work table upon upward movement of said plate, means connected to the drive means for intermittently reciprocating said plate, a bracket supported above the work holder at at least one of the last-mentioned positions of the work table, a wick supported by said bracket above the open top of the work holder at said last-mentioned position of the work table, said wick having at least one end thereof extending into a supply of a bonding material in liquid form and a member resiliently supported by said bracket and extending through the portion of the wick positioned above the work holder.

19. In an assembling apparatus, the combination of a rotatable work table, drive means for rotating said table to a series of positions in a step by step movement, a series of work holders carried in spaced relation to each other on the work table, each of said work holders being shaped to receive and hold a number of parts of an article in position for assembly and having an open top and a vertically reciprocable bottom to receive and support parts of the article being assembled therein, a plate supported beneath said work table, said plate being vertically reciprocable with respect to said work table, members yieldably supported on said plate in position for engagement with the bottoms of the work holders at spaced positions of the work table upon upward movement of said plate, means connected to the drive means for intermittently reciprocating said plate, a bracket supported above the work holder at at least one of the last-mentioned positions of the work table, a wick supported by said bracket above the open top of the work holder at said last-mentioned position of the work table, said wick having at least one end thereof extending into a supply of a bonding material in liquid form, and magazines for feeding parts of the article being assembled to the work holders, said magazines being located at positions of the work table on opposite sides of the position at which the wick-supporting bracket is located.

20. In an assembling apparatus, the combination of a rotatable work table, drive means for rotating said table to a series of positions in a step by step movement, a series of work holders carried in spaced relation to each other on the work table, each of said work holders being shaped to receive and hold a number of parts of an article in position for assembly and having an open top and a vertically reciprocable bottom to receive and support parts of the article being assembled therein, a plate supported beneath said work table, said plate being vertically reciprocable with respect to said work table, members yieldably supported on said plate in position for engagement with the bottoms of the work holders at spaced positions of the work table upon upward movement of said plate, means connected to the drive means for intermittently reciprocating said plate, a bracket supported above the work holder at at least one of the last-mentioned positions of the work table, a wick supported by said bracket above the open top of the work holder at said last-mentioned position of the work table, said wick having at least one end thereof extending into a supply of a bonding material in liquid form, magazines for feeding parts of the article being assembled to the work holders, said magazines being located at positions of the work table on opposite sides of the position at which the wick-supporting bracket is located and means connected to the vertically reciprocable plate for operating said magazines to feed one of the parts contained therein to the work holders positioned therebeneath.

References Cited in the file of this patent

UNITED STATES PATENTS

| Number | Name | Date |
|---|---|---|
| 1,402,780 | McManus | Jan. 10, 1922 |
| 1,931,294 | Nagy | Oct. 17, 1933 |
| 1,998,757 | Hauk | Apr. 23, 1935 |
| 2,050,191 | Liebowitz | Aug. 4, 1936 |
| 2,483,028 | Waldinger | Sept. 27, 1949 |
| 2,529,777 | McInnis | Nov. 14, 1950 |
| 2,539,318 | Orsino | Jan. 23, 1951 |
| 2,549,808 | Heinle et al. | Apr. 24, 1951 |